T. R. WEYMOUTH.
APPARATUS FOR INDICATING AND RECORDING THE FLOW OF FLUIDS.
APPLICATION FILED APR. 6, 1912.

1,085,184.

Patented Jan. 27, 1914.

3 SHEETS—SHEET 1.

WITNESSES

INVENTOR

T. R. WEYMOUTH.
APPARATUS FOR INDICATING AND RECORDING THE FLOW OF FLUIDS.
APPLICATION FILED APR. 6, 1912.
1,085,184.
Patented Jan. 27, 1914.
3 SHEETS—SHEET 2.
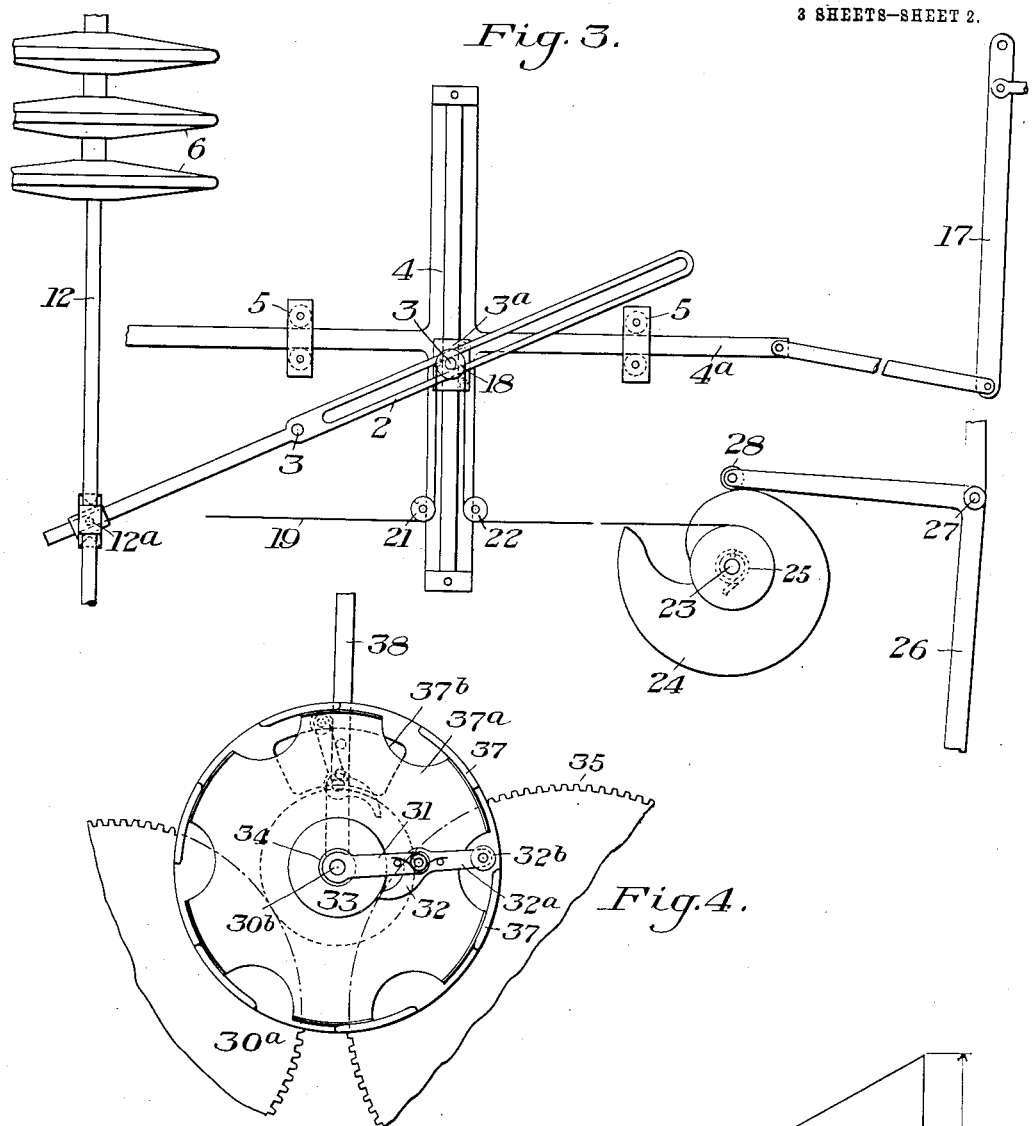
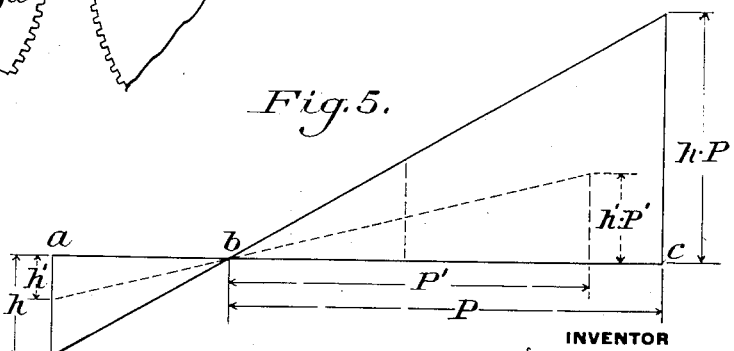
WITNESSES
INVENTOR T. R. WEYMOUTH.
APPARATUS FOR INDICATING AND RECORDING THE FLOW OF FLUIDS.
APPLICATION FILED APR. 6, 1912.
1,085,184.
Patented Jan. 27, 1914.
3 SHEETS—SHEET 3.
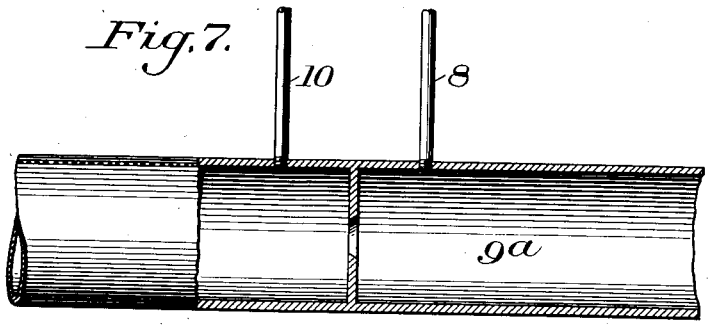
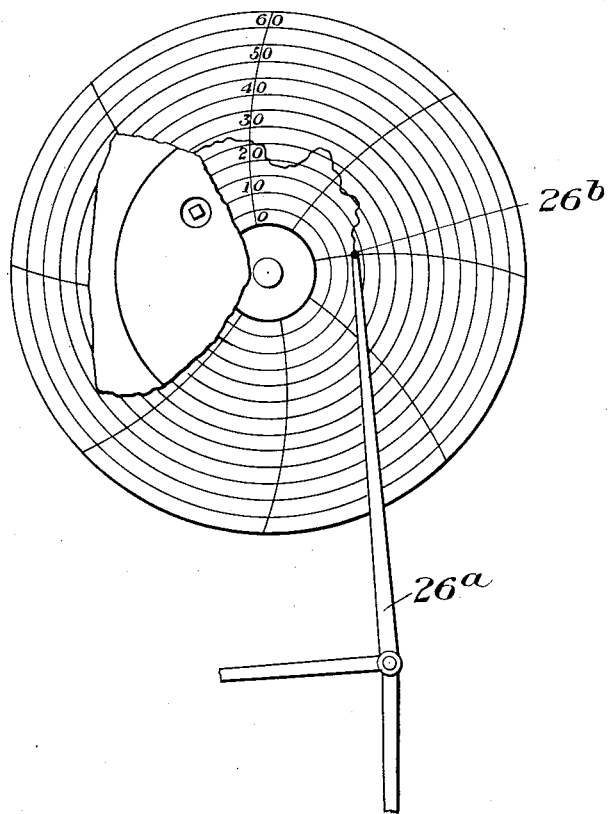
WITNESSES
INVENTOR

UNITED STATES PATENT OFFICE.

THOMAS R. WEYMOUTH, OF OIL CITY, PENNSYLVANIA.

APPARATUS FOR INDICATING AND RECORDING THE FLOW OF FLUIDS.

1,085,184. Specification of Letters Patent. Patented Jan. 27, 1914.

Application filed April 6, 1912. Serial No. 689,007.

*To all whom it may concern:*

Be it known that I, THOMAS R. WEYMOUTH, of Oil City, Venango county, Pennsylvania, have invented a new and useful Improvement in Apparatus for Indicating and Recording the Flow of Fluids, of which the following is a full, clear, and exact description, reference being had to the accompanying drawings, forming part of this specification, in which—

Figure 1:
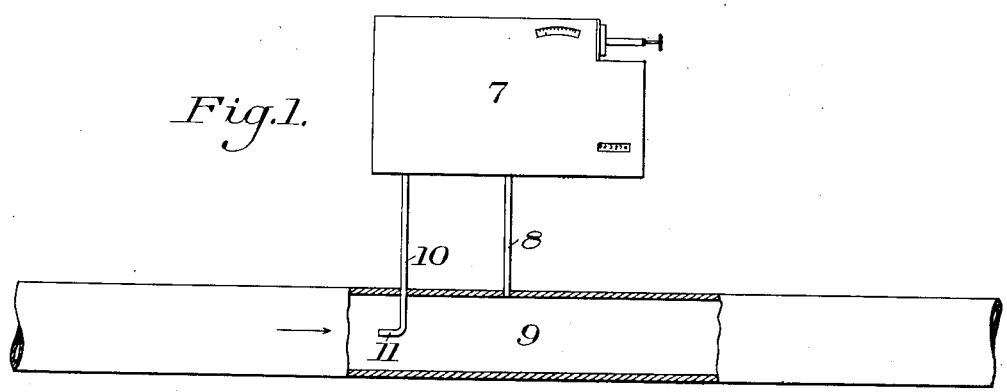
Figure 2:
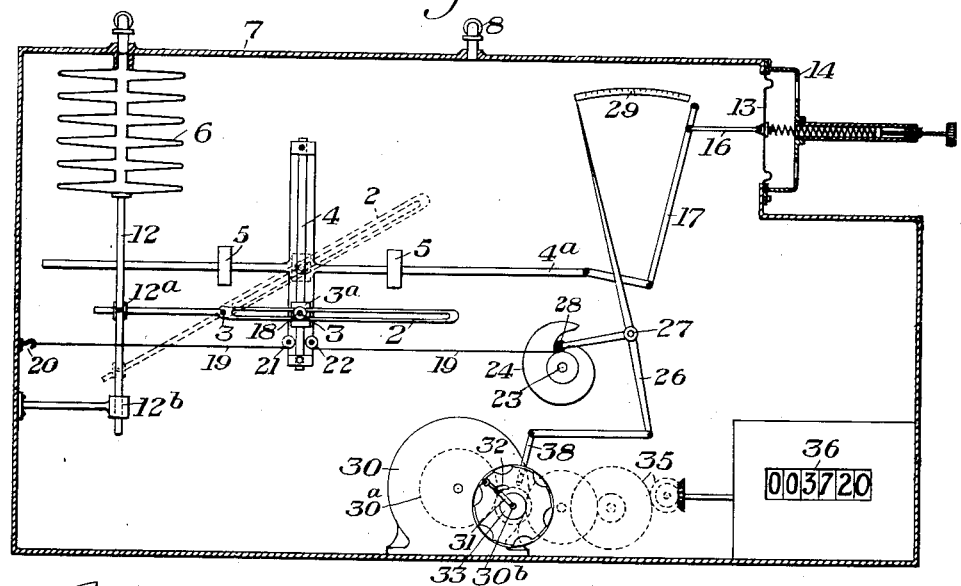
Figure 6:
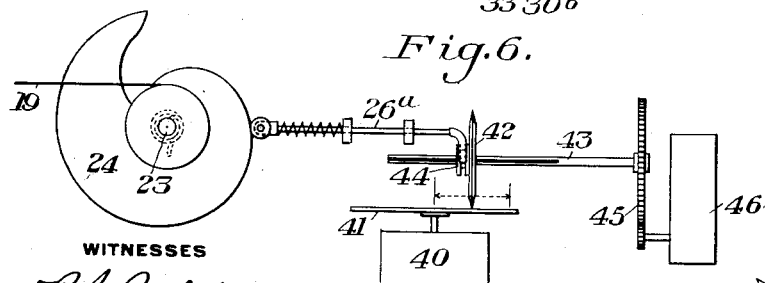

Figure 1 is a diagram illustrating the manner in which an indicating and recording apparatus is connected with the gas pipe in which the flow of gas is to be measured;
Fig. 2 is a view, also largely diagrammatic and showing the indicating and recording apparatus; Fig. 3 is a view on a larger scale of a portion of the apparatus shown in Fig. 2; Fig. 4 is a detail view of a portion of the apparatus; Fig. 5 is a diagram which illustrates one of the principles embodied in the construction and operation of the apparatus; Fig. 6 is a view partly in side elevation and partly diagrammatic, showing a modification of a portion of the apparatus. Fig. 7 is a sectional view illustrating the use of my invention in connection with the orifice method of obtaining static and impact, or velocity, pressures. Fig. 8 is a front view of a portion of a recording instrument which may be employed in connection with my invention.

My invention has relation to means for indicating and recording the flow of gas in a pipe or other conduit. The flow of gas through a pipe or other conduit may be determined by the formula $$Q = C\sqrt{hP},$$

in which C is a coefficient determined experimentally and dependent upon the diameter of the pipe, the specific gravity of the gas, its temperature, etc.; $h$ the impact or velocity pressure of the gas; and P the static pressure of the gas. It has been customary to determine the factor $h$ by means of a Pitot tube, or by an orifice, to determine the factor P by means of a suitable pressure gage, and to then solve the equation by actual calculations, tables being sometimes employed to assist in these calculations.

My invention is designed to provide an apparatus, or meter, of simple and efficient character, which will mechanically perform the calculations necessary to the solution of the above equation, and which may be made to indicate either the value $$\sqrt{hP}$$

or the value of

$$C\sqrt{hP}$$

at any and all times, or which may be made to register the actual volume of gas flowing through the pipe in a given time.

The nature of my invention will be best understood by reference to the accompanying drawings, in which I have shown more or less diagrammatically one embodiment thereof, it being premised, however, that the invention is susceptible of various other embodiments within the spirit and scope of the appended claims.

Referring first to the diagram shown in Fig. 5, if the line $a$, $b$, $c$ be taken to represent the center line of a lever pivoted at $b$; the distance $h$ to represent movement imparted to the said lever by and in proportion to the impact pressure of the flowing gas; and P the lever arm proportional in length to the static pressure of the gas, it will be apparent that the distance $hP$ will indicate or be proportionate to the product $hP$. Similarly, if the distance $h'$ represent the movement caused by and in proportion to the impact pressure of the gas, and the distance $P'$ the length of lever arm proportional to the static pressure of the gas, then the distance $h'P'$ will be equal to or proportional to the value $h'P'$. In the embodiment of my invention I make use of apparatus operating in part upon the principle shown in this diagram, Fig. 5. This apparatus is shown as consisting of a slotted lever 2 having a fulcrum at 3, and pivoted to a block 3ª which is capable of vertical movement in the guide 4. This guide 4 forms part of a movable carriage indicated as mounted on rollers 5. Connected to one arm of the lever 2 is a multiple diaphragm differential pressure gage 6. This gage, together with the entire apparatus, is shown as being inclosed in a box or casing 7. This box or casing has a connection at 8 with the pipe 9, in which the flow of gas is to be measured so that the interior of the box, and consequently, the exterior of the pressure gage 6, will be subject to the static pressure of the gas flowing in pipe 9. The interior of the pressure gage 6 is connected by pipe 10 with a Pitot tube 11, which extends into the pipe 9 in the usual manner of these tubes. It will be apparent that the effective movement of the gage 6, which is transmitted to the lever 2 by means of the rod or stem connection 12, will be proportional to the difference between the total pressure of the gas in the Pitot tube and the static pressure surrounding the diaphragm, and will, therefore, be proportioned to the impact or dynamic pressure of the gas. The degree of inclination of the lever 2 will, therefore, be controlled by the degree of this impact or dynamic pressure. 13 is a diaphragm, forming a part of one of the end walls of the box 7, and protected by a casing 14. This diaphragm has a connection 16 with a lever 17, which is in turn connected to the carriage $4^a$ carrying the guide 4. The movement of the carriage is, therefore, controlled by and is proportioned to the static pressure of the gas. The stem 12 of the diaphragm 6 is connected to the lever 2 by a suitable universal joint, indicated at $12^a$, so that its movement will be in a right line, said stem also having a guide at $12^b$. The shiftable block $3^a$ of the lever 2 is vertically movable in the guide 4, and carries a pulley 18. 19 is a flexible member, such as a chain, which is fixed at 20 at one end, and which passes over guide pulley 21 on the guide 4, and is thence looped upwardly and over the pulley 18 and thence downwardly and around a second guide pulley 22 on the carriage 4 and thence to a sheave on a shaft 23. It will be apparent that so long as the carriage $4^a$ is moved horizontally by the operation of the diaphragm 13, through the multiplying lever 17, with lever 2 in the horizontal or zero position shown in full lines in Fig. 2, and without any change in the inclination of the said lever 2, the length of the flexible member 19 will not be changed, and there will be no movement of the shaft 23; but when said lever 2 is in an inclined position, due to the action of the impact pressure, any change in either of the pressures will result in a vertical movement of the pivot block $3^a$ in the guide 4. Any vertical movement of the pivot block and of the pulley 18, of course, tends to effect a change in the length of the flexible member 19, and thereby gives the shaft 23 an angular movement. This angular movement, as will be readily seen from the foregoing explanation of Fig. 5, will be exactly proportional to the value $hP$, in the equation given. Inasmuch as said equation requires a determination of the value of the square root of $hP$, it is, of course, necessary to translate the angular movements of the shaft 23 into movements which shall be equal to the square roots of these angular movements. I effect this by means of a cam 24 fastened to the shaft 23. The cam surface of this cam is formed by a curve, which is plotted from the values of the square roots of the angular movement of the shaft 23. Thus, in plotting this curve, the abscissæ may be laid out to indicate different values of such angular, or $hP$ movements, while the ordinates are laid out to represent successive values of the square roots of such movements. The curve so obtained can be readily converted into the spiral curve illustrated in Figs. 2 and 3. The cam 24 with its actuating connection constitutes a motion-reducing device or member for reducing the proportional movements of the shiftable member $3^a$ to a root value thereof. 25 is a spring, which is attached to shaft 23 to constantly take up any slack in the flexible member 19. 26 is a lever, which is fulcrumed at 27, and which carries a roller 28 on one arm thereof for contact with the surface of the cam 24. A second arm of this lever forms a pointer adapted to traverse a scale 29. This scale may be graduated so as to give different values of the square root of $hP$, or it may be graduated to include the coefficient C of the particular Pitot tube or orifice to which the apparatus is connected, and thus to indicate the rate of flow of gas in the pipe line at any instant of time, according to the formula $$Q = C\sqrt{hP}.$$

A pen may also be attached to the end of said pointer and made to traverse a chart driven by suitable clock-work in the manner of the ordinary recording gage, thus giving a permanent record of the rate of flow and its variations throughout any period of time. A suitable and well known form of recording instrument for this purpose is illustrated in Fig. 8. In this figure, the lever member $26^a$ which carries the recording pen $26^b$ corresponds to the member 26 of Figs. 2 and 3.

In order that the apparatus may register the actual volume of gas flowing in a given time, it is necessary to multiply the values indicated on the scale 29 by the coefficient C and to provide means whereby the result in the desired form will be indicated by a suitable dial or register. To this end, I employ the following mechanism: 30 designates a clock, or clock-work, which is adapted to constantly operate, and which, through suitable gearing indicated at $30^a$, is made to revolve a shaft $30^b$, having fixed thereto a jointed pawl arm 31. Pivoted to this arm is a pawl 32, which is designed to have a frictional driving engagement with the periphery of a wheel 33 carried by a sleeve 34, which is loosely mounted on the shaft $30^b$. The sleeve 34 is connected by a train of gearing 35 with an indicating register 36 of any well known character. This train of gearing embodies one or more change wheels, and corresponds to the factor C in the above stated equation. With a proper arrangement of the gearing, corresponding to the coefficient C, as experimentally determined in the particular case in which the flow of gas is to be measured, and with the clock 30 constantly driving the register 36, the greatest possible maximum flow of gas through the pipe would be indicated by the register. The action of the gearing in driving the register must, therefore, be modified in accordance with the instantaneous values of the quantity $$\sqrt{hP},$$

as indicated by the scale 29. To this end I provide the outer end of the pawl arm $32^a$ with a roller $32^b$, which is arranged to contact with separated segments or sections 37 of a broken circular ring. Within this broken circular ring I mount a member or disk $37^a$, which also has a plurality of separated peripheral segments or sections $37^b$ which are adapted to move inside of the sections or segments 37. The arrangement is such that when the wheel $32^b$ is in contact with either a section 37 or a section $37^b$, its pawl 32 will be held out of driving engagement with the friction disk, as indicated in dotted lines in Fig. 4; but when the said roller is opposite one of the spaces between the segments or sections, the pawl will be in driving engagement with said disk. The disk $37^a$ is connected by a lever device 38 with an arm of the lever 26 before referred to. It will, therefore, be apparent that the member $37^b$ will be shifted angularly in exact proportion to the angular movements of the arm of the lever 26, which carries the cam contact wheel or roller 28. Therefore, the length of the opening between segments 37 and $37^b$, and accordingly the length of time during each rotation of the shaft $30^b$ and of the pawl arm 31, in which the pawl 32 will be in contact with its friction disk, will depend upon the angular movement of the lever 26, and which is, as before stated, proportional to the quantity $$\sqrt{hP}.$$

So long as the pawl 32 is in engagement with its friction disk, the clock-work is driving the register 36, but when the pawl 32 is out of driving engagement with the disk, the register is out of operation. The pawl 32 and its disk, therefore, form in effect a clutch element in the driving gearing between the clock-work and the register, and this clutch element is controlled by the angular movement of the arm 26. It will, therefore, be apparent that the register 36 correctly indicates the total amount of gas flowing in accordance with the above stated equation. That is to say, if the register is read every twenty-four hours, the volume of gas which has passed through the pipe during the preceding twenty-four hours will be indicated by the register.

In Fig. 6 I have shown a different mechanism for transmitting the movement of the cam actuated member 26 and for utilizing such movement to control the motor. In this figure, 40 designates the motor which drives a friction wheel or disk 41. 42 is a friction wheel having its periphery in contact with the surface of the disk 41, and which is longitudinally movable on a shaft or arbor 43. The wheel 42 has a clutch-hub 44 which is engaged by a connection attached to the cam operated member $26^a$. 45 indicates gears connecting the shaft 43 with the register 46, these gears being arranged for a certain value of C. The speed of the shaft 43 will, of course, depend upon the distance of the wheel 42 from the center of the disk 41; and as this distance is controlled by the square root cam, the action of the register is modified to give the same result as in the form first described.

The advantages of my invention will be apparent, since it provides a simple and efficient form of meter for the purpose described, and which will obviate the necessity for the frequent gage readings which have heretofore been necessary, together with the large amount of calculations which have also been necessary, in order to make use of the results of the readings.

It will be understood that instead of employing a Pitot tube for obtaining within the diaphragm the sum of the impact and static pressures, this may be obtained by the orifice method, or by any other method known in the art. Thus in Fig. 7, I have shown the usual orifice pipe $9^a$, 8 and 10 being the connections with said pipe at opposite sides of the orifice, and which correspond to the connections 8 and 10 of Fig. 1. It will also be apparent that the pressure gages employed to obtain the movements corresponding to the respective values $hP$ may be widely varied; that the arrangement and mounting of the shiftable lever actuated by these gages may also be changed, and that various devices may be employed for translating and transmitting the movements of this lever in order to obtain true readings either on a scale similar to the scale 29, or on a register like the register 36, or upon either one of these alone. The cam device may, of course, be modified so as to indicate any desired root of the quantity $hP$. It will also be apparent that, so far as the principle of operation is concerned, the operation will be the same if the impact pressure is caused to vary the effective length of lever arm and the static pressure is made to control the angular movement of the lever, since the result is dependent only upon the product of these two factors. There may be mechanical reasons, however, whereby in a particular embodiment of my invention one or the other arrangement may be preferable. If some other device, such as the well known orifice method, be employed to determine the quantity $h$, such quantity will be more properly designated as the "velocity" pressure instead of the "impact" pressure, and the term "impact pressure" as used herein is to be understood, wherever necessary, as indicating both impact and velocity pressures.

While the invention has been more particularly described in connection with measuring the flow of gas, this term is to be understood in its broad sense of including any fluid of a gaseous nature, whether vapor or a true gas, since it is equally well adapted to measure the flow of steam. Certain features of the invention are also applicable to measuring the flow of liquids.

I claim:—

1. In apparatus of the character described, the combination of a motive device actuated by the static pressure of the fluid, another motive device actuated by the impact or velocity pressure of such fluid, a lever having a shiftable member, connections operated by the respective motive devices to cause movements of said shiftable member to be proportional to the product of the two pressures, another member connected to and actuated by the shiftable member, said other member being constructed and arranged to reduce said proportional movement to a root value thereof, and an indicating device actuated by the last named member, substantially as described.

2. In apparatus of the character described, the combination of a motive device actuated by the static pressure of the fluid, another motive device actuated by the impact or velocity pressure of such fluid, a lever having a shiftable member, connections operated by the respective motive devices to cause the movements of said shiftable member to be proportional to the product of the two pressures, another member connected to and actuated by the shiftable member, said other member being constructed and arranged to reduce said proportional movement to a root value thereof, and a recording mechanism operated by the last named member and recording the actual volume of the flowing fluid, substantially as described.

3. Apparatus for measuring the quantity of a flowing fluid, comprising a lever having a shiftable member, pressure devices for determining respectively the static and impact, or velocity, pressures of the flow of fluid to be measured, an actuating connection between one of said pressure devices and an arm of the lever member to vary the position of said lever, an actuating connection operated by the other pressure device to vary the effective length of the other arm of the lever member, an indicating or registering apparatus and means for transmitting the movements of said shiftable member resulting from its actuating connections to the indicating or registering apparatus; substantially as described.

4. Apparatus for measuring the quantity of a flowing fluid, comprising pressure devices actuated respectively by the static and impact, or velocity, pressures of the fluid being measured and having movements respectively proportional to said pressures, a movable member, actuating connections between said member and the two pressure devices, said member having a combined movement derived from said connections and which is proportional to the product of the separate movements, together with a motion reducing device for reducing such movements to values equal to the square roots thereof; substantially as described.

5. Apparatus for measuring the quantity of a flowing fluid, comprising pressure devices arranged to be acted upon respectively by the static and the impact, or velocity, pressures of the fluid being measured, a lever having a shiftable member, actuating connections operated by the respective pressure devices for effecting a compound movement of the shiftable member, an indicating or registering device, means for transmitting said movement to the indicating or registering device, and motion-reducing devices for reducing said movement to values equal to the square roots thereof; substantially as described.

6. Apparatus for measuring the quantity of a flowing fluid, comprising pressure devices arranged to be operated respectively by the static and the impact, or velocity, pressures of the fluid being measured, a lever having a shiftable member, connections operated respectively by the pressure devices for shifting said member and whereby the movements thereof are proportional to the product of the two pressures, means for transmitting said movements, motion-reducing devices for reducing said movements to values equal to the square roots thereof, a register, a constantly driven motor for driving the register, a clutch element intermediate the motor and register and means for controlling the clutch element by said lever member; substantially as described.

7. Apparatus for measuring the quantity of a flowing fluid, comprising pressure devices operated respectively by the static and the impact, or velocity, pressures of the fluid being measured, a lever having a shiftable member, actuating members connected to the respective pressure devices for shifting the said member and whereby the movements thereof are proportional to the product of the two pressures, means for transmitting said movements, motion-reducing devices for reducing said movements to values equal to the square roots thereof, together with a register, a constantly driven motor for driving the register, a clutch element in the connections between the motor and the register, and means for controlling the clutch element whereby the time during which the register is driven by the motor is proportional to the square root values indicated by the movement reducing devices; substantially as described.

8. Apparatus for measuring the quantity of a flowing fluid, comprising pressure devices arranged to be actuated respectively by the static, and the impact or velocity, pressures of the fluid being measured, a lever member, means connected with the pressure devices and with said lever and constructed and arranged to produce a compound movement of the lever proportional to the product of the said pressures, a motion reducing device for reducing the movements of said lever to values equal to the square roots thereof, and means whereby said lever controls the action of a registering device together with a registering device controlled by said lever; substantially as described.

9. In apparatus for measuring the quantity of a flowing fluid, the combination with pressure devices which are subject to the action of the static and impact, or velocity, pressures of the fluid being measured, a movable member and a motion reducing mechanism for causing said devices to effect the movement of the said member proportional to the square root of the product of the two pressures, of a register, a constantly driven motor for driving the register, and means controlled by said member for modifying the action of the register; substantially as described.

10. In apparatus for measuring the quantity of a flowing fluid, the combination with mechanism actuated by the combined action of the static and the impact, or velocity, pressures of the flowing fluid, of a motion-reducing member operatively connected with the pressure devices to effect a movement proportional to the square root of the product of the two pressures, a register, and a constantly driven motor for driving the register, gearing intermediate the motor and register including a clutch element, and means controlled by said member for controlling the action of the clutch element; substantially as described.

11. Apparatus for measuring the quantity of a flowing fluid, comprising pressure devices subject to the action respectively of the static and of the impact, or velocity, pressures of a flowing fluid, a lever having a shiftable member, actuating connections between the pressure devices and the shiftable member whereby the latter will be moved proportionally to the product of the two pressures, means for transmitting said movement, motion-reducing devices for reducing said movements to values equal to the square roots thereof, together with a register, a constantly driven motor for driving the register, a variable speed device in the connections between the motor and the register, and means for controlling said device by the said lever member; substantially as described.

12. Apparatus for measuring the quantity of a flowing fluid, comprising pressure devices respectively subject to and operated by the static and impact, or velocity, pressures of the fluid being measured, a lever having a shiftable member operatively connected with both pressure devices whereby its movements are proportional to the product of the two pressures, means for transmitting said movements, motion-reducing devices for reducing said movements to values equal to the square roots thereof, together with a register, a constantly driven motor for driving the register, a variable speed device in the connections between the motor and the register, and means for controlling said device whereby the time during which the register is driven by the motor is proportional to the square root values which are indicated by the movement reducing devices; substantially as described.

13. Apparatus for measuring the quantity of a flowing fluid, comprising pressure devices, subject to and actuated, respectively, by the static and impact, or velocity, pressures of the fluid being measured, a lever having a shiftable member which is operatively connected with both pressure devices to effect a movement proportional to the product of the two pressures, an indicating or registering device, means for transmitting said movement to the indicating or registering device, and motion-reducing devices for reducing said movement to values equal to a root thereof; substantially as described.

14. In apparatus for measuring the quantity of a flowing fluid, the combination of a lever member and pressure devices connected to said lever member to cause the inclination of the latter with respect to its zero position to be proportional to the velocity pressure of the fluid to be measured, another movable member associated with the lever, a second pressure device arranged to transmit motion to the last-named movable member in a direction perpendicular to that of the first pressure device, and subject to the action of the static pressure of the fluid, the said pressure device causing the last-named movable member to assume an ultimate position the perpendicular distance of which from the zero position of the lever member will at all times be proportional to the product of the movements produced by the two pressures and therefore to the product of the pressures themselves; substantially as described.

In testimony whereof, I have hereunto set my hand.

THOS. R. WEYMOUTH.

Witnesses:
 Geo. Yardley,
 C. W. Gleason.